United States Patent
Lee et al.

(10) Patent No.: US 11,382,040 B2
(45) Date of Patent: Jul. 5, 2022

(54) METHOD AND DEVICE FOR DETERMINING SIDELINK TRANSMIT POWER IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/410,705

(22) Filed: Aug. 24, 2021

(65) Prior Publication Data

US 2021/0385751 A1 Dec. 9, 2021

Related U.S. Application Data

(63) Continuation of application No. PCT/KR2020/002693, filed on Feb. 25, 2020.
(Continued)

(30) Foreign Application Priority Data

Sep. 6, 2019 (KR) .................. 10-2019-0111066
Oct. 18, 2019 (KR) .................. 10-2019-0130268

(51) Int. Cl.
*H04W 52/02* (2009.01)
*H04L 5/00* (2006.01)
(Continued)

(52) U.S. Cl.
CPC ....... *H04W 52/0245* (2013.01); *H04L 5/0051* (2013.01); *H04W 52/10* (2013.01); *H04W 52/242* (2013.01); *H04W 92/18* (2013.01)

(58) Field of Classification Search
CPC ..... H04W 92/18; H04W 24/10; H04W 52/10; H04W 56/001; H04W 52/0245;
(Continued)

(56) References Cited

U.S. PATENT DOCUMENTS 9,288,743 B2 * 3/2016 Yang ................ H04W 72/0453
2011/0038271 A1 * 2/2011 Shin .................... H04W 52/16
370/252
(Continued)

FOREIGN PATENT DOCUMENTS

KR    1020160128390      11/2016
KR    10-2019-0068209  *  6/2019
(Continued)

OTHER PUBLICATIONS

ETSI TS 136 213 V14.2.0 (Apr. 2017), "LTE; Evolved Universal Terrestrial Radio Access (E-UTRA); Physical layer procedures". (Year: 2017).*
(Continued)

*Primary Examiner* — Ricardo H Castaneyra
(74) *Attorney, Agent, or Firm* — Lee, Hong, Degerman, Kang & Waimey PC

(57) ABSTRACT

Provided are a method by which a first device performs wireless communication, and a device for supporting same. The method can comprise the steps of: transmitting one or more reference signals (RSs) to a second device on the basis of first transmit power; receiving, from the second device, information related to a channel state measured on the basis of the one or more RSs; changing the first transmit power to second transmit power on the basis of the information related to the channel state; and transmitting the one or more RSs to the second device on the basis of the second transmit power.

20 Claims, 21 Drawing Sheets

Related U.S. Application Data

(60) Provisional application No. 62/810,353, filed on Feb. 25, 2019, provisional application No. 62/896,566, filed on Sep. 5, 2019.

(51) Int. Cl.
  *H04W 52/10* (2009.01)
  *H04W 52/24* (2009.01)
  *H04W 92/18* (2009.01)

(58) Field of Classification Search
  CPC .......... H04W 52/242; H04W 52/325; H04W 52/383; H04W 52/241; H04W 4/40; H04L 5/0051; Y02D 30/70
  See application file for complete search history.

(56) References Cited

U.S. PATENT DOCUMENTS

| | | | |
|---|---|---|---|
| 2013/0244715 A1 | 9/2013 | Kwon et al. | |
| 2015/0085787 A1* | 3/2015 | Ouchi | H04L 5/0037 370/329 |
| 2015/0208410 A1* | 7/2015 | Koutsimanis | H04W 72/0426 370/252 |
| 2017/0150490 A1* | 5/2017 | Chen | H04W 76/27 |
| 2020/0260386 A1* | 8/2020 | Ryu | H04W 52/383 |

FOREIGN PATENT DOCUMENTS

| | | |
|---|---|---|
| WO | 2016047994 | 3/2016 |
| WO | 2017171895 | 10/2017 |

OTHER PUBLICATIONS

PCT International Application No. PCT/KR2020/002693, International Search Report dated May 28, 2020, 4 pages.

Samsung, "Considerations on Sidelink Power Control", R1-1902286, 3GPP TSG RAN WG1 #96, Mar. 2019, 7 pages.

Huawei, HiSilicon, "Reference signal design for sidelink control and data channel", R1-1901538, 3GPP TSG RAN WG1 Meeting #96, Mar. 2019, 8 pages.

3rd Generation Partnership Project; Technical Specification Group Radio Access Network; NR; Radio Resource Control (RRC) protocol specification (Release 15), 3GPP TS 38.331 V15.4.0, Dec. 2018, 474 pages.

European Patent Office Application Serial No. 20762377.8, Search Report dated Mar. 1, 2022, 10 pages.

Samsung, "Discussion on Physical Layer Procedures", R1-1812985, 3GPP TSG RAN WG1 Meeting #95, Nov. 2018, 6 pages.

Panasonic, "UE power headroom, MAC filtering and way forward", R2-052103, 3GPP TSG-RAN WG2 Meeting #48, Sep. 2005, 5 pages.

3 Generation Partnership Project; Technical Specification Group Radio Access Network; Evolved Universal Terrestrial Radio Access (E-UTRA); Physical layer procedures (Release 15); 3GPP TS 36.213 V15.4.0, Dec. 2018, Section 14.1.1.5, 46 pages.

3rd Generation Partnership Project; Technical Specification Group Radio Access Network; Radio Resource Control (RRC); Protocol specification (Release 15); 3GPP TS 25.331 V15.4.0, Sep. 2018, chapter 8.6.7, 66 pages.

* cited by examiner

FIG. 4
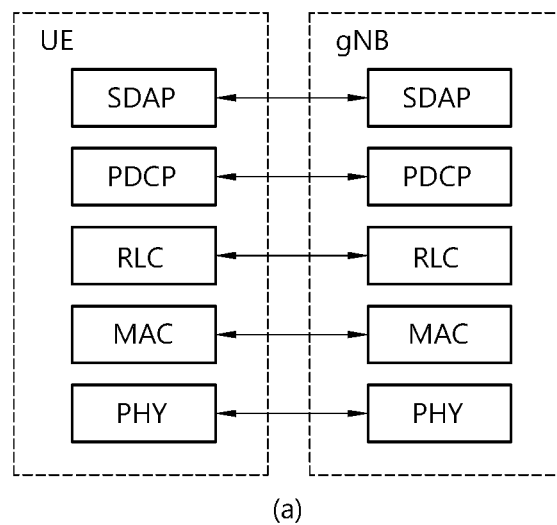
(a)
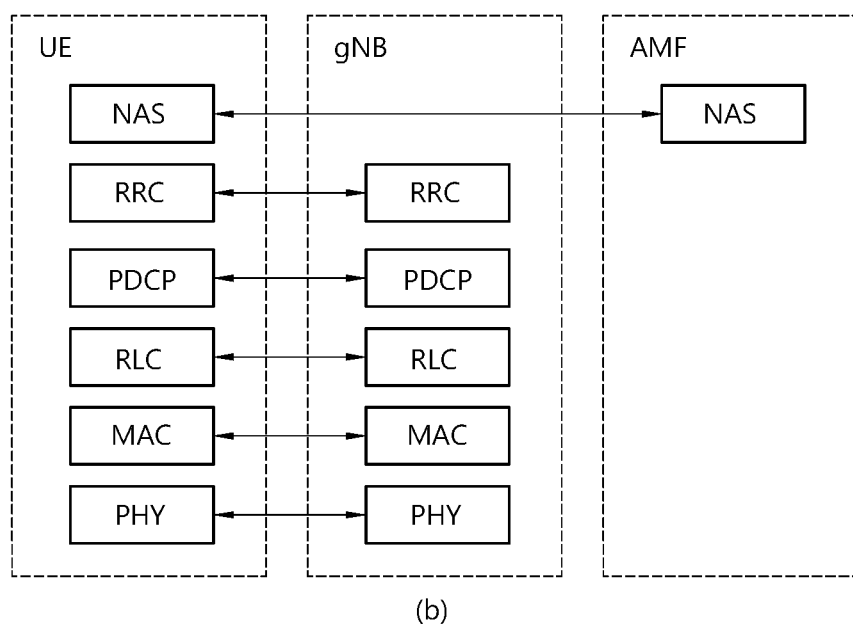
(b)

FIG. 8
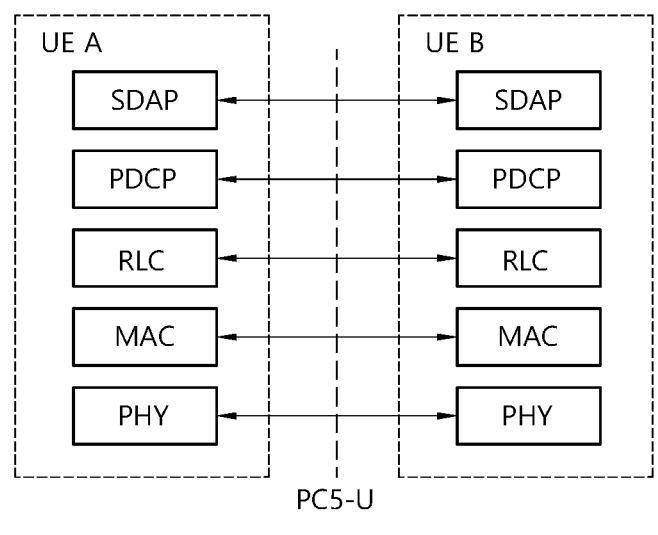
(a)
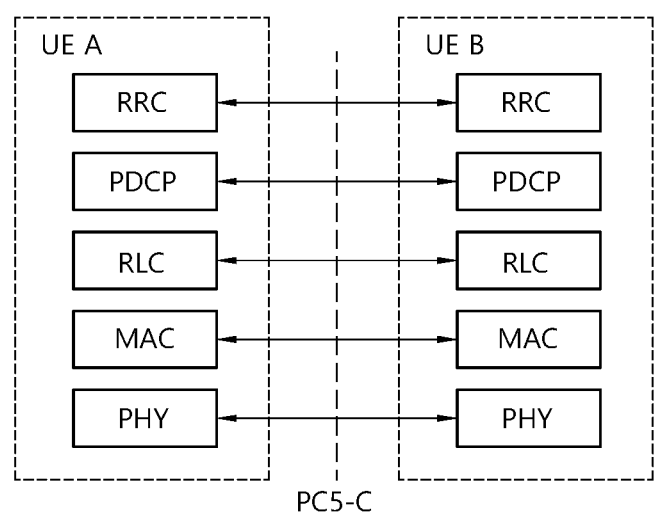
(b)

METHOD AND DEVICE FOR DETERMINING SIDELINK TRANSMIT POWER IN NR V2X

CROSS-REFERENCE TO RELATED APPLICATIONS

This application is a continuation of International Application No. PCT/KR2020/002693, filed on Feb. 25, 2020, which claims the benefit of earlier filing date and right of priority to Korean Patent Application Nos. 10-2019-0111066, filed on Sep. 6, 2019, and 10-2019-0130268, filed on Oct. 18, 2019, and also claims the benefit of U.S. Provisional Application Nos. 62/810,353, filed on Feb. 25, 2019 and 62/896,566, filed on Sep. 5, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in SL communication, a transmitting UE needs to efficiently determine SL transmit power in consideration of pathloss between the transmitting UE and receiving UE(s).

Technical Solutions

In one embodiment, a method for performing wireless communication by a first device is provided. The method may comprise: transmitting, to a second device, one or more reference signals (RSs) based on first transmit power; receiving, from the second device, information related to a channel state measured based on the one or more RSs; changing the first transmit power to second transmit power based on the information related to the channel state; and transmitting, to the second device, the one or more RSs based on the second transmit power.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: transmit, to a second device, one or more reference signals (RSs) based on first transmit power; receive, from the second device, information related to a channel state measured based on the one or more RSs; change the first transmit power to second transmit power based on the information related to the channel state; and transmit, to the second device, the one or more RSs based on the second transmit power.

EFFECTS OF THE DISCLOSURE

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
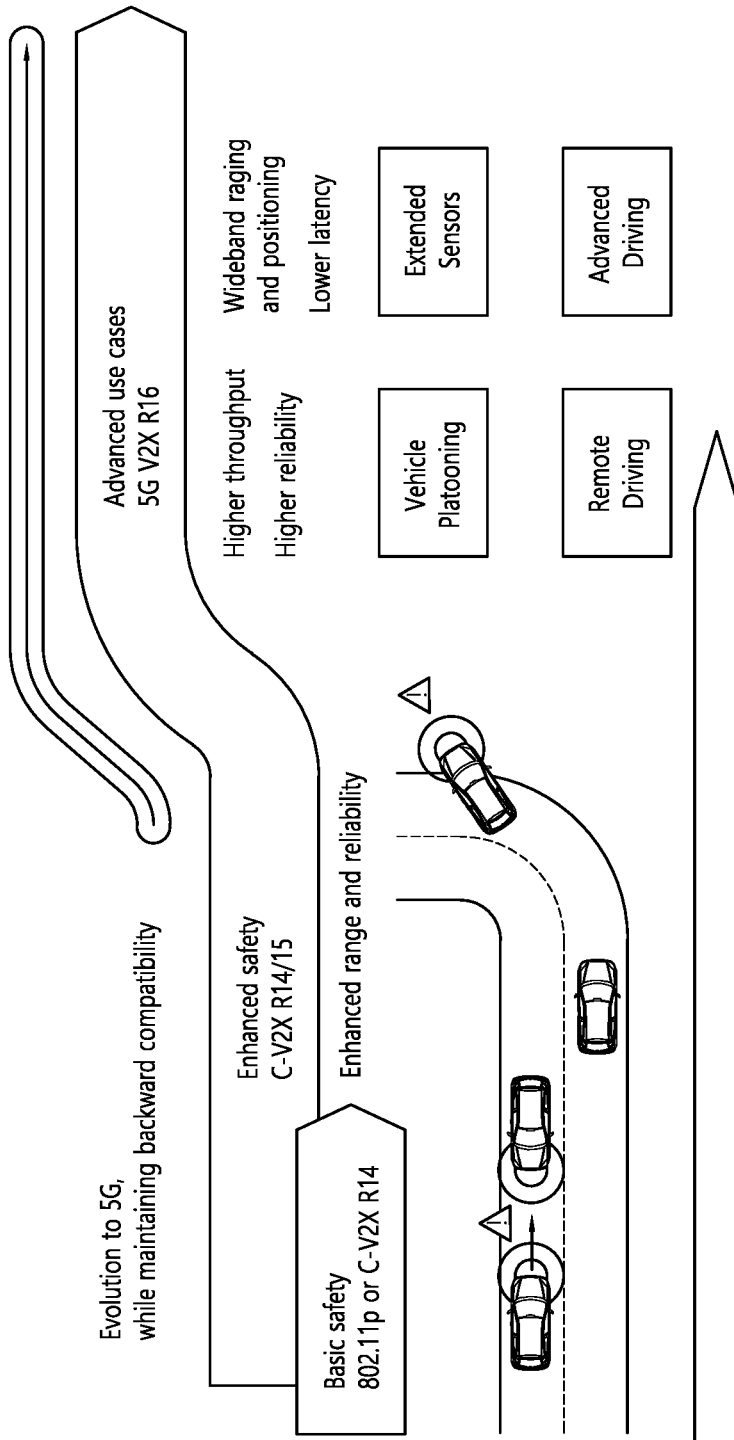
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
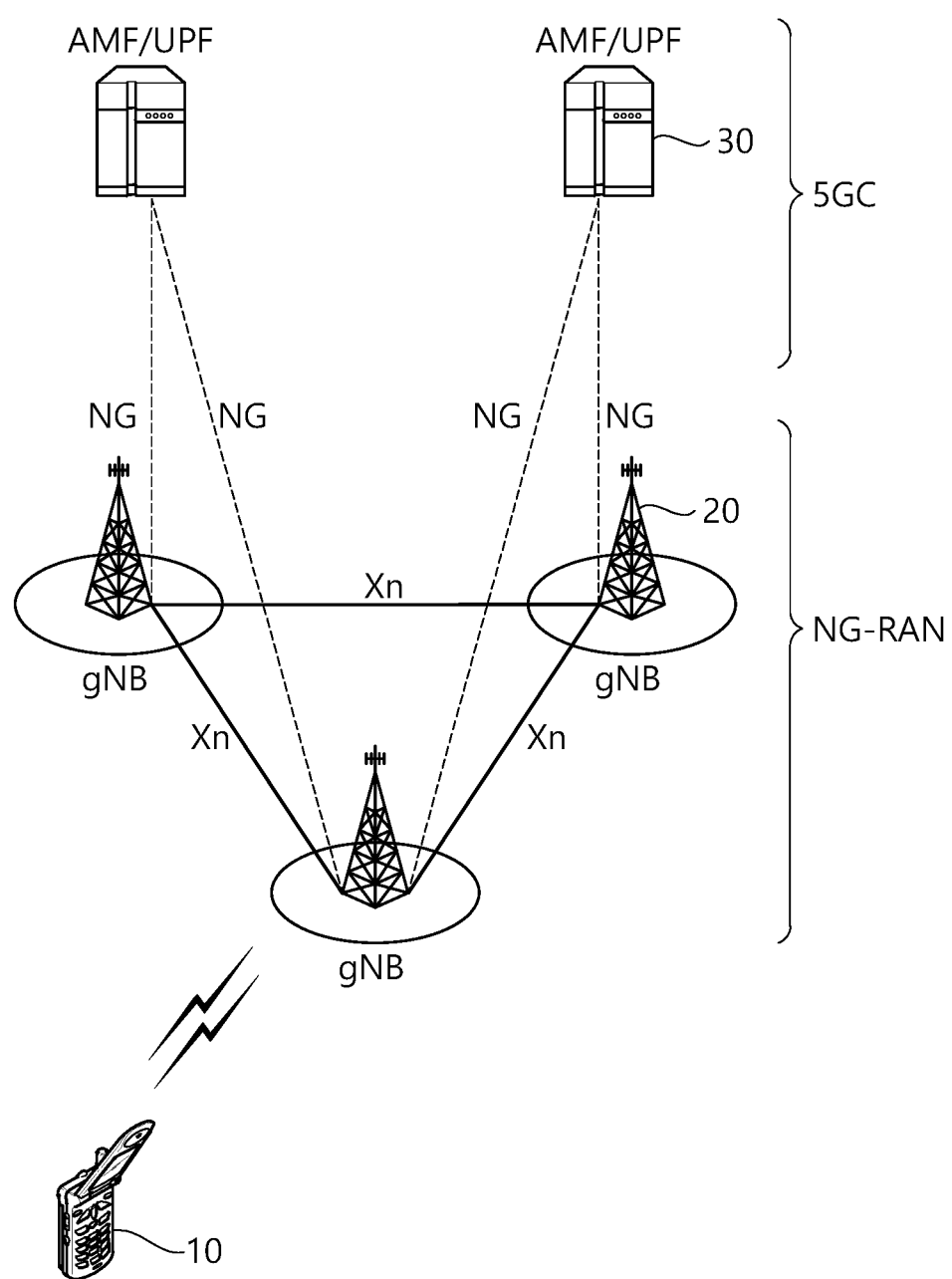
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
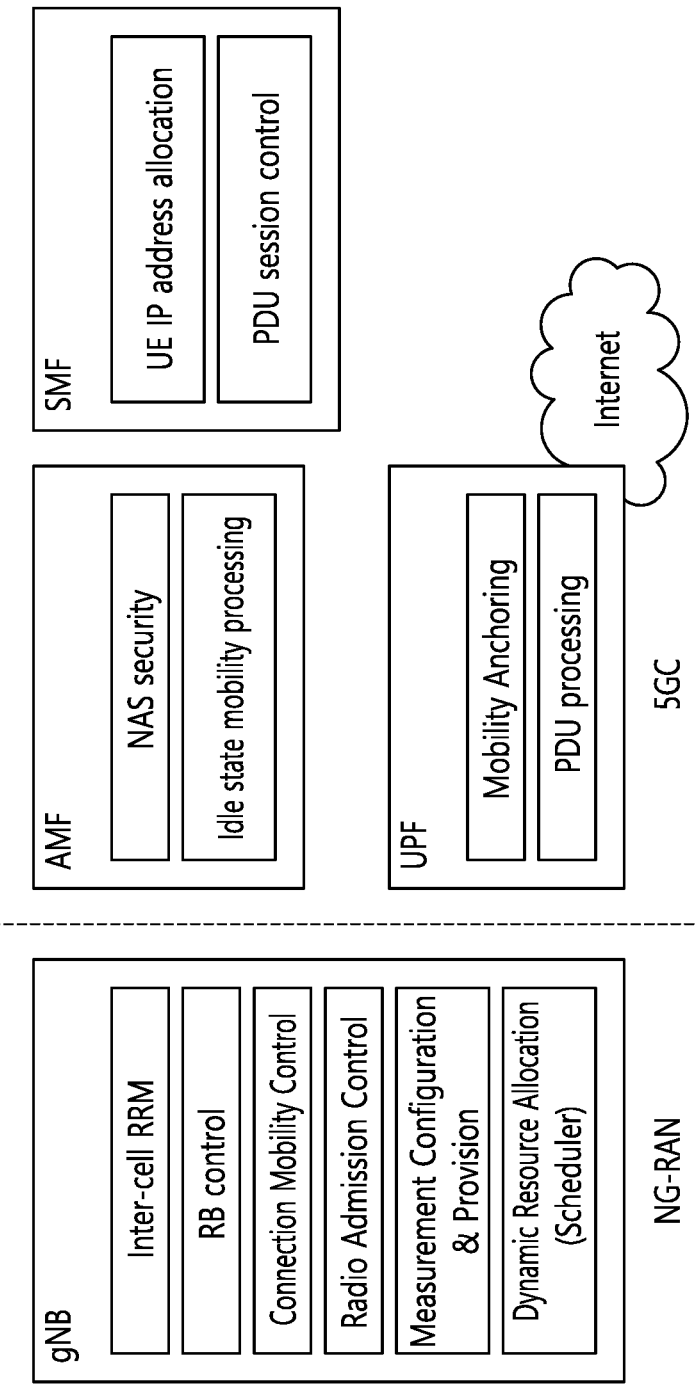
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
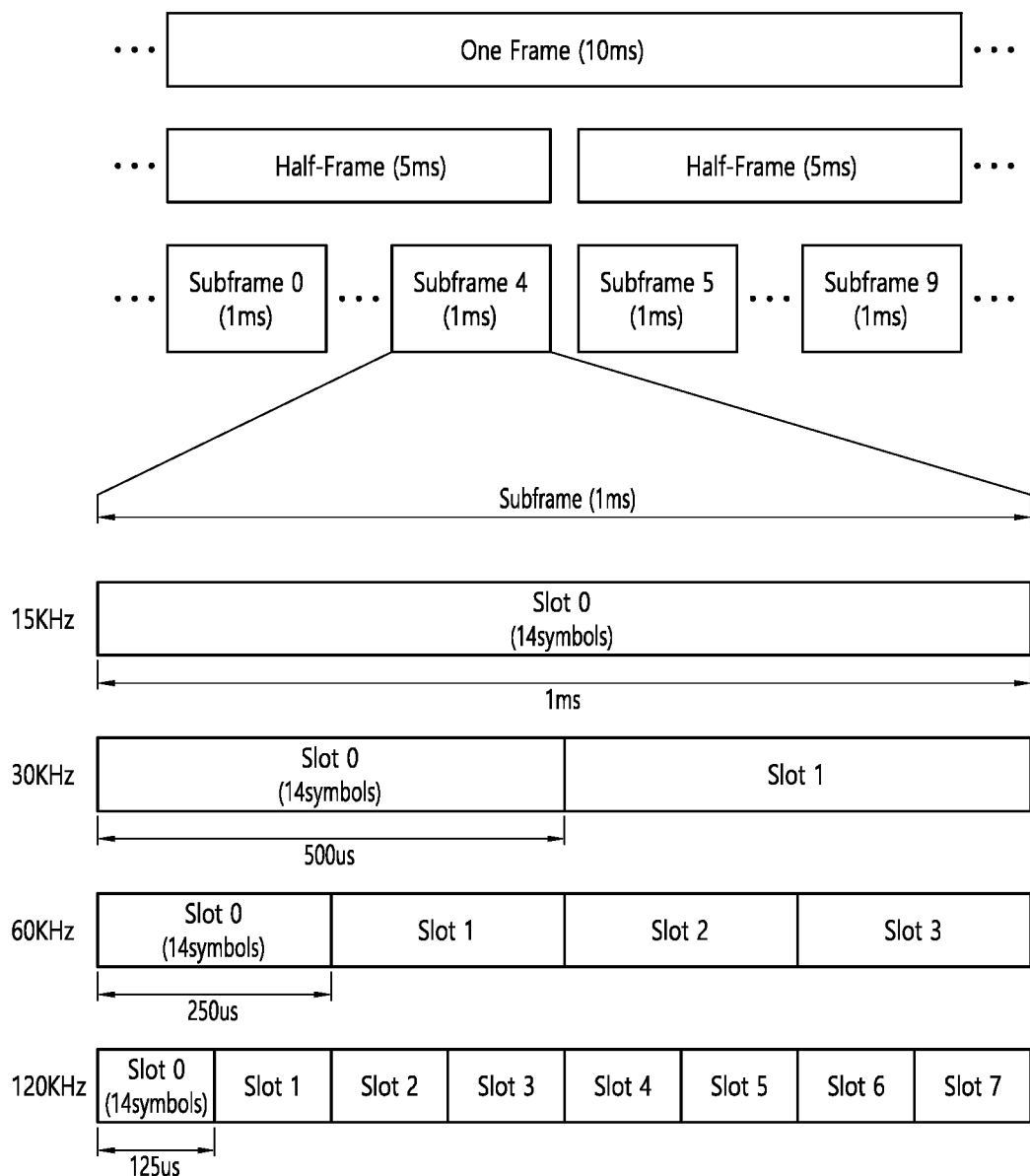
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u_{slot}}$ | $N^{subframe, u_{slot}}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u_{slot}}$ | $N^{subframe, u_{slot}}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
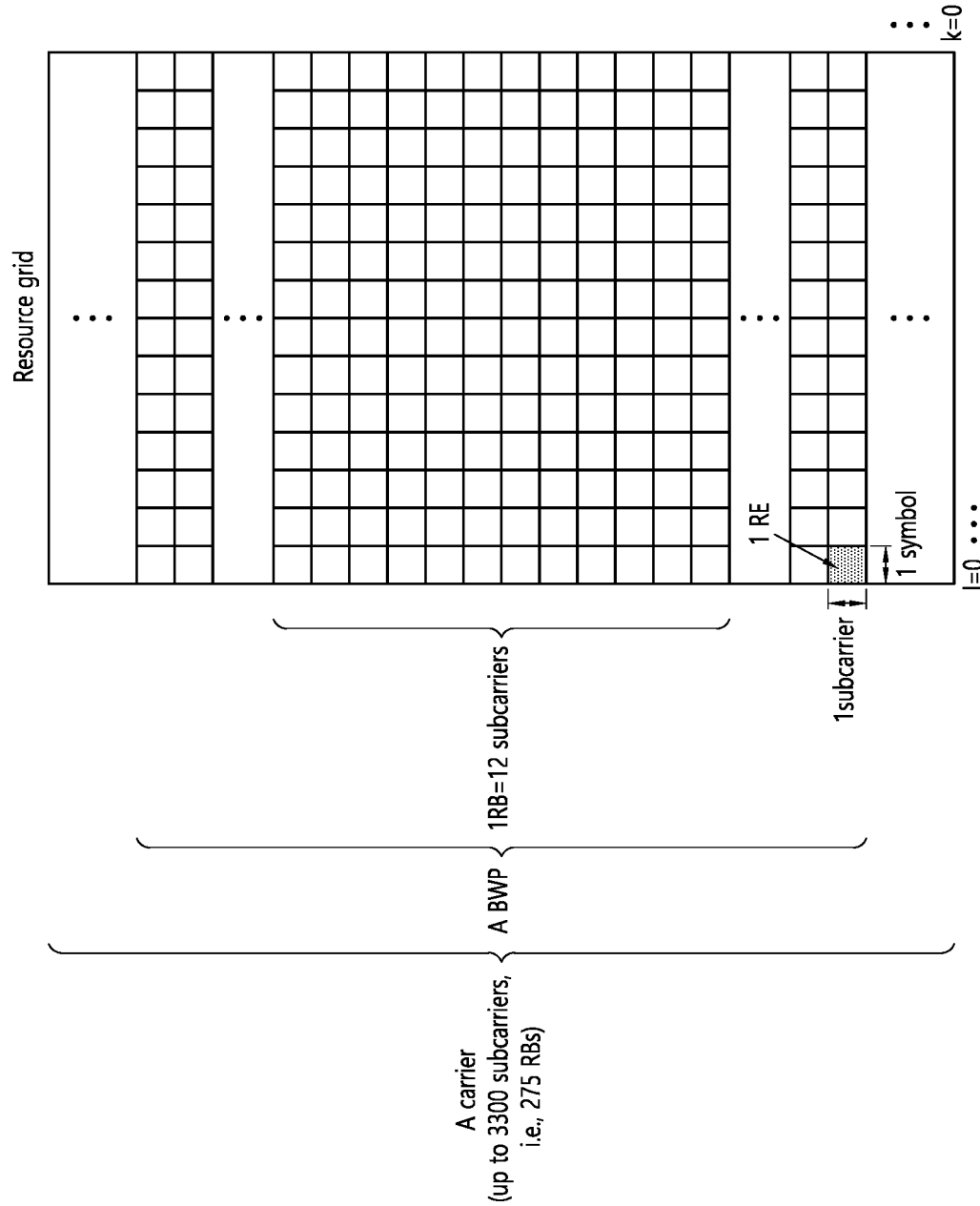
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
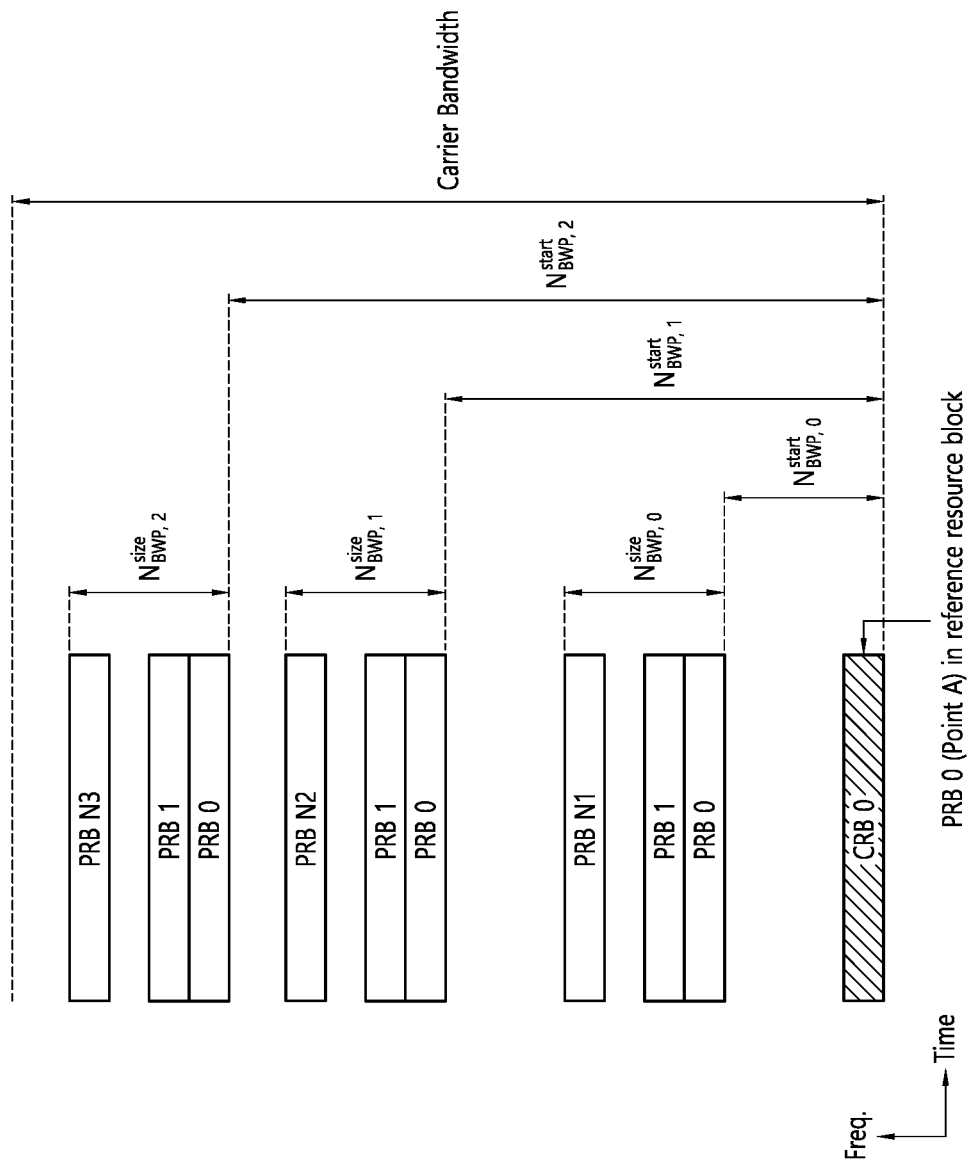
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
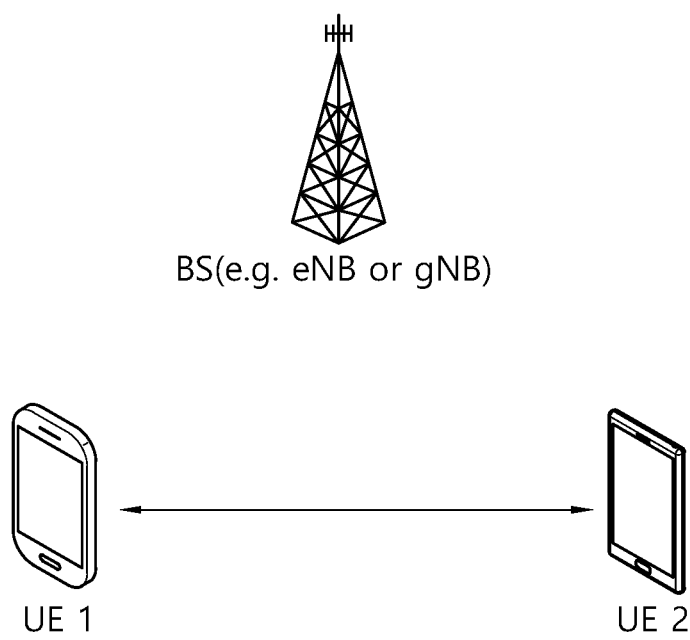
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
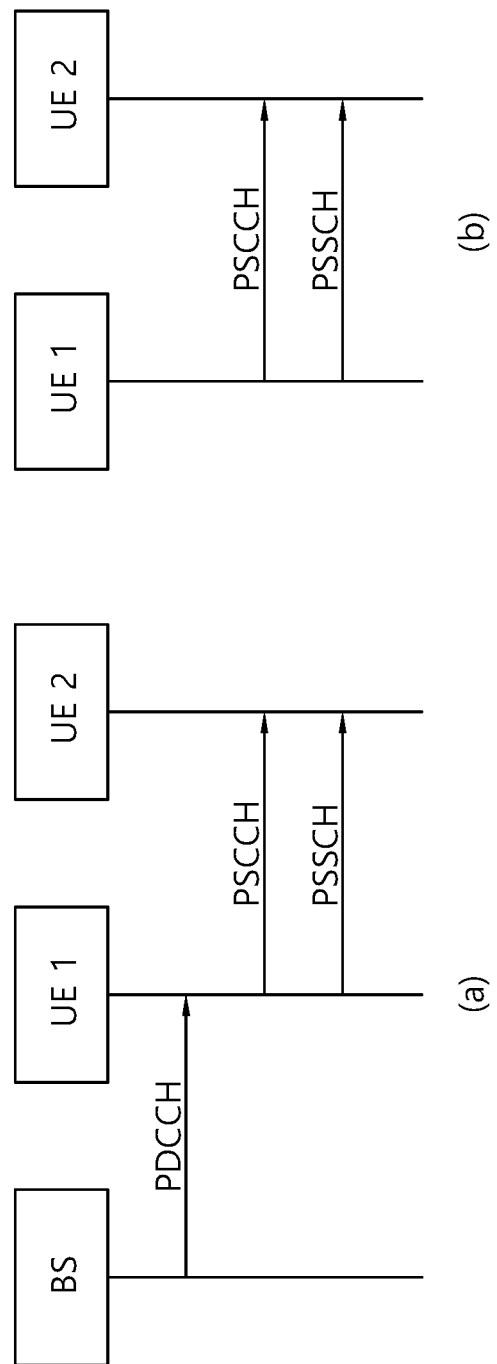
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
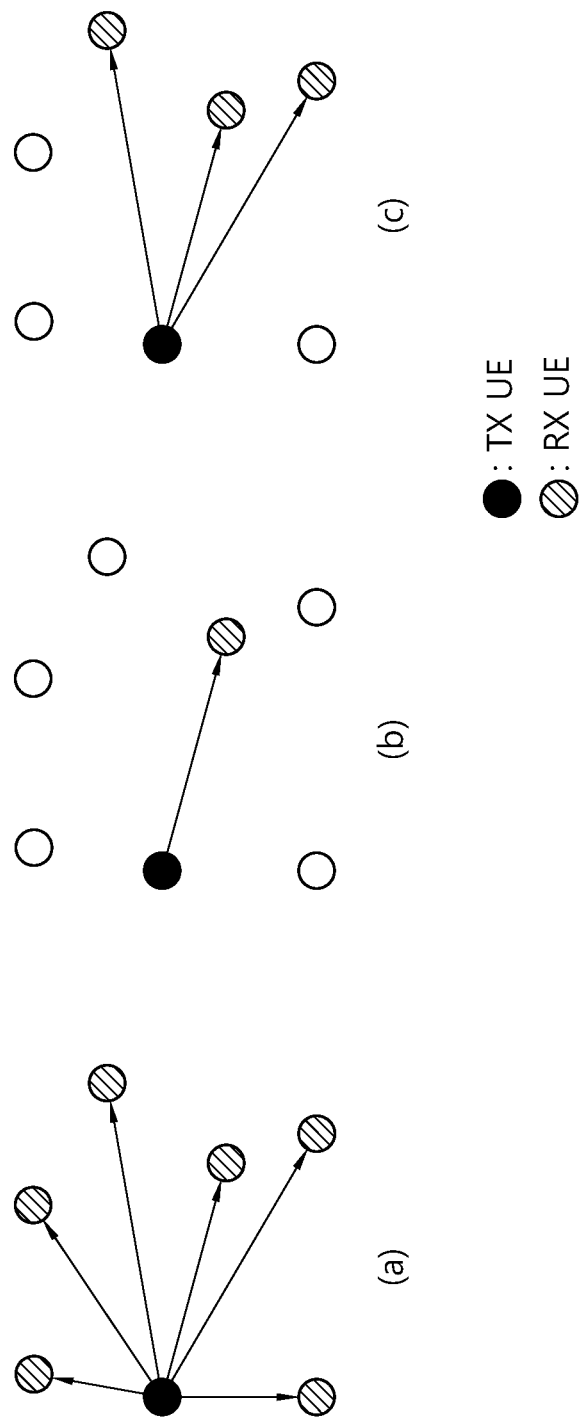
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, power control will be described.

A method in which a UE controls uplink transmit power thereof may include open loop power control (OLPC) and closed loop power control (CLPC). Based on the OLPC, the UE may estimate a downlink pathloss from a BS of a cell to which the UE belongs, and the UE may perform power control in such a manner that the pathloss is compensated for. For example, based on the OLPC, if a distance between the UE and the BS further increases and thus a downlink pathloss increases, the UE may control uplink power in such a manner that uplink transmit power is further increased. Based on the CLPC, the UE may receive information (e.g., a control signal) required to adjust uplink transmit power from the BS, and the UE may control uplink power based on the information received from the BS. That is, based on the CLPC, the UE may control the uplink power based on a direct power control command received from the BS.

The OLPC may be supported in SL. Specifically, when the transmitting UE is inside the coverage of the BS, the BS may enable OPLC for unicast, groupcast, and broadcast transmission based on the pathloss between the transmitting UE and a serving BS of the transmitting UE. If the transmitting UE receives information/configuration for enabling the OLPC from the BS, the transmitting UE may enable OLPC for unicast, groupcast, or broadcast transmission. This may be to mitigate interference for uplink reception of the BS.

Additionally, at least in case of unicast, a configuration may be enabled to use the pathloss between the transmitting UE and the receiving UE. For example, the configuration may be pre-configured for the UE. The receiving UE may report an SL channel measurement result (e.g., SL RSRP) to the transmitting UE, and the transmitting UE may derive pathloss estimation from the SL channel measurement result reported by the receiving UE. For example, in SL, if the transmitting UE transmits a reference signal to the receiving UE, the receiving UE may estimate a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating for the estimated pathloss, and may perform SL transmission for the receiving UE. Based on the OLPC in SL, for example, if a distance between the transmitting UE and the receiving UE further increases and thus the SL pathloss increases, the transmitting UE may control SL transmit power in such a manner that the SL transmit power is further increased. The power control may be applied in SL physical channel (e.g., PSCCH, PSSCH, physical sidelink feedback channel (PSFCH)) and/or SL signal transmission.

In order to support the OLPC, at least in case of unicast, long-term measurement (e.g., L3 filtering) may be supported on SL.

For example, total SL transmit power may be identical in symbols used for PSCCH and/or PSSCH transmission in a slot. For example, maximum SL transmit power may be configured for the transmitting UE or may be pre-configured.

For example, in case of the SL OLPC, the transmitting UE may be configured to use only a downlink pathloss (e.g., a pathloss between the transmitting UE and the BS). For example, in case of the SL OLPC, the transmitting UE may be configured to use only an SL pathloss (e.g., a pathloss between the transmitting UE and the receiving UE). For example, in case of the SL OLPC, the transmitting UE may be configured to use a downlink pathloss and the SL pathloss.

For example, if the SL OLPC is configured to use both the downlink pathloss and the SL pathloss, the transmitting UE may determine a minimum value as transmit power among power obtained based on the downlink pathloss and power obtained based on the SL pathloss. For example, P0 and an alpha value may be configured separately for the downlink pathloss and the SL pathloss or may be pre-configured. For example, P0 may be a user-specific parameter related to SINR received on average. For example, the alpha value may be a weight value for the pathloss.

Hereinafter, L3 filtering will be described.

A UE may measure reference signals received power (RSRP) based on reference signal(s). In addition, the UE may perform L1 filtering and/or L3 filtering for the RSRP. For example, based on Table 5, the UE may perform L3 filtering for the RSRP measured based on the reference signal(s).

TABLE 5

5.5.3.2 Layer 3 filtering

The UE shall:
  for each cell measurement quantity and for each beam measurement quantity that the UE performs measurements:
    filter the measured result, before using for evaluation of reporting criteria or for measurement reporting, by the following formula:
      $F_n = (1 - a) * F_{n-1} + a * M_n$
    where
      $M_n$ is the latest received measurement result from the physical layer;
      $F_n$ is the updated filtered measurement result, that is used for evaluation of reporting criteria or for measurement reporting;
      $F_{n-1}$ is the old filtered measurement result, where $F_n$ is set to $M_1$ when the first measurement result from the physical layer is received; and for NR, $a = \frac{1}{2}^{(k+4)}$, where $k_i$ is the filterCoefficient for the corresponding measurement quantity of the inth QuantityConfigNR is quantityConfigNR-List, and i is indicated by quantityConfigIndex in MeasObjectNR; for E-UTRA, $a = \frac{1}{2}^{(k+4)}$, where k is the filterCoefficient for the corresponding measurement quantity received by quantity ConfigEUTRA in the quantityConfig;

TABLE 5-continued 5.5.3.2 Layer 3 filtering adapt the filter such that the time characteristics of the filter are preserved at different input rates, observing that the filterCoefficient k assumes a sample rate equal to X ms; The value of X is equivalent to one intra-frequency L1 measurement period as defined in 3GPP TS 38.133 assuming non-DRX operation, and depends on frequency range.

NOTE
1: If k is set to 0, no layer 3 filtering is applicable.
NOTE
2: The filtering is performed in the same domain as used for evaluation of reporting criteria or for measurement reporting, i.e., logarithmic filtering for logarithmic measurements.
NOTE
3: The filter input rate is implementation dependent, to fulfill the performance requirements set in 3GPP TS 38.133. For further details about the physical layer measurements, see 3GPP TS 38.133.

Referring to Table 5, for each cell measurement quantity and for each beam measurement quantity that the UE performs measurements, the UE may perform filter the measured result, before using for evaluation of reporting criteria or for measurement reporting, based on Equation 1.

$$F_n = (1-a)*F_{n-1} + a*M_n$$ [Equation 1]

For details on L3 filtering, refer to 3GPP TS 38.331 V15.4.0.

In the present disclosure, for example, a transmitting UE may be referred to as a TX UE, and a receiving UE may be referred to as a RX UE.

In the present disclosure, for example, "RSRP" may be replaced with "L3 RSRP measurement value", or vice versa. For example, "RSRP" may be replaced with "L1 RSRP measurement value", or vice versa.

In the present disclosure, for example, "configuration" may include that UE(s) receives or receives in advance information related to the configuration through pre-defined signaling from network(s). For example, "definition" may include that UE(s) receives or receives in advance information related to the definition through pre-defined signaling from network(s). For example, "definition" may include that information related to the definition is defined in advance for UE(s). For example, the network(s) may be base station(s) and/or V2X server(s). For example, the pre-defined signaling may include at least one of SIB, MAC signaling, and/or RRC signaling.

Based on an embodiment of the present disclosure, a TX UE performing SL communication may be configured to determine transmit power based on a value of SL pathloss between the TX UE and a RX UE. For example, the TX UE may determine power for SL transmission based on the value of SL pathloss between the TX UE and the RX UE. For example, the TX UE may be a UE performing unicast communication with the RX UE. For example, the TX UE may be a UE performing groupcast communication with the RX UE. For example, the TX UE may estimate/obtain the value of SL pathloss between the TX UE and the RX UE based on value(s) of RSRP reported by the RX UE.

Figure 12:
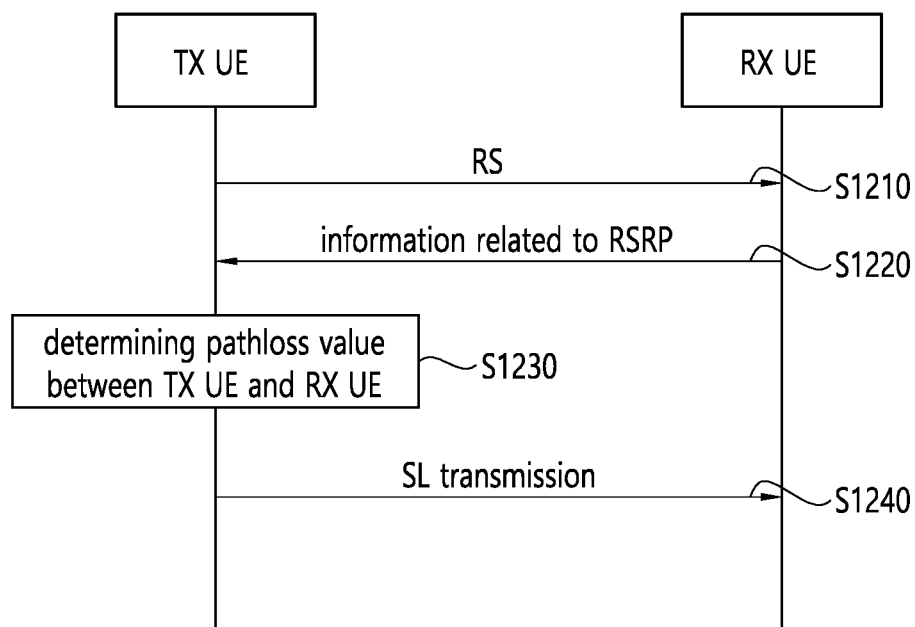
FIG. 12 shows a procedure for a UE to determine transmit power, based on an embodiment of the present disclosure.

FIG. 12 shows a procedure for a UE to determine transmit power, based on an embodiment of the present disclosure. The embodiment of FIG. 12 may be combined with various embodiments of the present disclosure.

Referring to FIG. 12, in step S1210, a TX UE may transmit reference signal(s) (RS(s)) to a RX UE. For example, the RS(s) may be RS(s) used for estimating/obtaining value(s) of RSRP. For example, the RS(s) may be RS(s) used by the RX UE to estimate/obtain value(s) of RSRP. For example, the RS(s) may be CSI-RS(s) and/or demodulation reference signal(s) (DM-RS(s)). For example, the DM-RS(s) may be PSSCH DM-RS(s) and/or PSCCH DM-RS(s). For example, transmit power of the RS(s) transmitted by the TX UE may be time-varying.

In step S1220, the RX UE may estimate or obtain value(s) of RSRP based on the RS(s). In addition, the RX UE may transmit information related to RSRP to the TX UE. For example, the information related to RSRP may include value(s) of RSRP measured by the RX UE based on the RS(s).

In step S1230, the TX UE may calculate or estimate/obtain a value of pathloss between the TX UE and the RX UE. For example, the TX UE may calculate or estimate/obtain a value of pathloss between the TX UE and the RX UE based on value(s) of RSRP and transmit power of the RS(s). For example, a procedure for the TX UE to obtain a value of pathloss may be one of the first case, the second case and/or the third case.

(1) First Case

For example, transmit power of the RS(s) transmitted by the TX UE may be time-varying. In this case, the TX UE may receive value(s) of layer-1 (L1) RSRP from the RX UE. Thereafter, the TX UE may perform L3 filtering or L3 averaging for value(s) of L1 RSRP, which is value(s) compensated by difference value(s) between a reference value of transmit power of RS(s) (hereinafter, RS_PW_REF value) and transmit power of RS(s) related to the value(s) of L1 RSRP (reported from the RX UE). Accordingly, the TX UE may obtain or determine an averaged value of RSRP based on L3 filtering. For example, the RS_PW_REF value may be pre-configured for the UE. In addition, finally, the TX UE may calculate or estimate/obtain a value of SL pathloss based on Equation 2.

$$\text{SL Pathloss} = \text{RS\_PW\_REF value} - \text{L3 filtered/averaged RSRP value}$$ [Equation 2]

(2) Second Case

For example, transmit power of the RS(s) transmitted by the TX UE may be time-varying. In this case, the RX UE may obtain value(s) of RSRP based on the RS(s) transmitted by the TX UE, and the RX UE may perform L3 filtering or L3 averaging for the value(s) of RSRP. Thereafter, the TX UE may receive an averaged value of RSRP based on L3 filtering, from the RX UE. In addition, the TX UE may obtain or determine a UP L3RSRP value, which is a value compensated by difference value(s) between the RS_PW_REF value and transmit power of RS(s) related to the L3 filtered or L3 averaged RSRP value (reported from the RX UE). In addition, finally, the TX UE may calculate or estimate/obtain a value of SL pathloss based on Equation 3.

$$SL\ Pathloss = RS\_PW\_REF\ value - UP\_L3RSRP\ value \quad [Equation\ 3]$$

(3) Third Case

For example, transmit power of the RS(s) transmitted by the TX UE may be time-varying. In this case, the RX UE may obtain value(s) of RSRP based on the RS(s) transmitted by the TX UE, and the RX UE may perform L3 filtering or L3 averaging for the value(s) of RSRP. Thereafter, the TX UE may receive an averaged value of RSRP based on L3 filtering, from the RX UE. In addition, the TX UE may calculate or estimate/obtain a value of SL pathloss based on difference between the RS_PW_REF value and the L3 filtered or L3 averaged RSRP value (reported from the RX UE). For example, finally, the TX UE may calculate or estimate/obtain a value of SL pathloss based on Equation 4.

$$SL\ Pathloss = RS\_PW\_REF\ value - L3\ filtered/averaged\ RSRP\ value \quad [Equation\ 4]$$

In the various embodiments described above, for example, the RS_PW_REF value may be an average value of values of transmit power used by the TX UE to transmit one or more RSs within a pre-configured (previous) time window. For example, the RS_PW_REF value may be a weighted average value of values of transmit power used by the TX UE to transmit one or more RSs within a pre-configured (previous) time window. For example, the RS_PW_REF value may be a maximum value among values of transmit power used by the TX UE to transmit one or more RSs within a pre-configured (previous) time window. For example, the RS_PW_REF value may be a minimum value among values of transmit power used by the TX UE to transmit one or more RSs within a pre-configured (previous) time window.

For example, the RS_PW_REF value may be an average value of values of transmit power used by the TX UE to transmit one or more RSs within a pre-configured time window, before a time when the TX UE receives (L3 or L1) RSRP value(s) from the RX UE. For example, the RS_PW_REF value may be a weighted average value of values of transmit power used by the TX UE to transmit one or more RSs within a pre-configured time window, before a time when the TX UE receives (L3 or L1) RSRP value(s) from the RX UE. For example, the RS_PW_REF value may be a maximum value among values of transmit power used by the TX UE to transmit one or more RSs within a pre-configured time window, before a time when the TX UE receives (L3 or L1) RSRP value(s) from the RX UE. For example, the RS_PW_REF value may be a minimum value among values of transmit power used by the TX UE to transmit one or more RSs within a pre-configured time window, before a time when the TX UE receives (L3 or L1) RSRP value(s) from the RX UE.

For example, the RS_PW_REF value may be an average value of values of transmit power used by the TX UE to transmit one or more RSs within a pre-configured time window, before a pre-configured offset value from a time when the TX UE receives (L3 or L1) RSRP value(s) from the RX UE. For example, the RS_PW_REF value may be a weighted average value of values of transmit power used by the TX UE to transmit one or more RSs within a pre-configured time window, before a pre-configured offset value from a time when the TX UE receives (L3 or L1) RSRP value(s) from the RX UE. For example, the RS_PW_REF value may be a maximum value among values of transmit power used by the TX UE to transmit one or more RSs within a pre-configured time window, before a pre-configured offset value from a time when the TX UE receives (L3 or L1) RSRP value(s) from the RX UE. For example, the RS_PW_REF value may be a minimum value among values of transmit power used by the TX UE to transmit one or more RSs within a pre-configured time window, before a pre-configured offset value from a time when the TX UE receives (L3 or L1) RSRP value(s) from the RX UE.

In the various embodiments described above, for example, the RS_PW_REF value may be an average value of values of transmit power used by the TX UE (previously) for the pre-configured number of RS transmissions and/or transmitting the pre-configured number of RSs. For example, the RS_PW_REF value may be a weighted average value of values of transmit power used by the TX UE (previously) for the pre-configured number of RS transmissions and/or transmitting the pre-configured number of RSs. For example, the RS_PW_REF value may be a maximum value among values of transmit power used by the TX UE (previously) for the pre-configured number of RS transmissions and/or transmitting the pre-configured number of RSs. For example, the RS_PW_REF value may be a minimum value among values of transmit power used by the TX UE (previously) for the pre-configured number of RS transmissions and/or transmitting the pre-configured number of RSs.

For example, the RS_PW_REF value may be an average value of values of transmit power used by the TX UE for the pre-configured number of RS transmissions and/or transmitting the pre-configured number of RSs, at the closest time before a time when the TX UE receives (L3 or L1) RSRP value(s) from the RX UE. For example, the RS_PW_REF value may be a weighted average value of values of transmit power used by the TX UE for the pre-configured number of RS transmissions and/or transmitting the pre-configured number of RSs, at the closest time before a time when the TX UE receives (L3 or L1) RSRP value(s) from the RX UE. For example, the RS_PW_REF value may be a maximum value among values of transmit power used by the TX UE for the pre-configured number of RS transmissions and/or transmitting the pre-configured number of RSs, at the closest time before a time when the TX UE receives (L3 or L1) RSRP value(s) from the RX UE. For example, the RS_PW_REF value may be a minimum value among values of transmit power used by the TX UE for the pre-configured number of RS transmissions and/or transmitting the pre-configured number of RSs, at the closest time before a time when the TX UE receives (L3 or L1) RSRP value(s) from the RX UE. For example, the pre-configured number of RS transmission and/or the pre-configured number of RSs may be 1.

For example, the RS_PW_REF value may be an average value of values of transmit power used by the TX UE for the pre-configured number of RS transmissions and/or transmitting the pre-configured number of RSs, at the closest time before a pre-configured offset value from a time when the TX UE receives (L3 or L1) RSRP value(s) from the RX UE. For example, the RS_PW_REF value may be a weighted average value of values of transmit power used by the TX UE for the pre-configured number of RS transmissions and/or transmitting the pre-configured number of RSs, at the closest time before a pre-configured offset value from a time when the TX UE receives (L3 or L1) RSRP value(s) from the RX UE. For example, the RS_PW_REF value may be a maximum value among values of transmit power used by the TX UE for the pre-configured number of RS transmissions and/or transmitting the pre-configured number of RSs, at the closest time before a pre-configured offset value from a time when the TX UE receives (L3 or L1) RSRP value(s) from the RX UE. For example, the RS_PW_REF value may be a minimum value among values of transmit power used by the TX UE for the pre-configured number of RS transmissions and/or transmitting the pre-configured number of RSs, at the closest time before a pre-configured offset value from a time when the TX UE receives (L3 or L1) RSRP value(s) from the RX UE.

For example, in case the TX UE calculates or derives/obtains the RS_PW_REF value, e.g., in case the TX UE calculates or derives/obtains an (weight) average value of transmit power values of a plurality of RSs, the TX UE may be configured to use or apply a coefficient (equally) which is used by the RX UE for L3 filtering or L3 averaging. For example, the coefficient may be a coefficient used by the RX UE to calculate or derive/obtain L3 filtered RSRP or L3 averaged RSRP. For example, if the RX UE calculates or derives/obtains L3 filtered RSRP or L3 averaged RSRP based on Equation 1, the TX UE may calculate or derive/obtain an (weight) average value of transmit power values of a plurality of RSs by using the same coefficient (e.g., a).

For example, in case the TX UE calculates or derives/obtains the RS_PW_REF value, e.g., in case the TX UE calculates or derives/obtains an (weight) average value of transmit power values of a plurality of RSs, the TX UE may be configured to use or apply time window information (equally) which is used by the RX UE for L3 filtering or L3 averaging. For example, in case the TX UE calculates or derives/obtains the RS_PW_REF value, the TX UE may be configured to use or apply information regarding the number of samples (e.g., RS transmit power value(s) to which (weight) averaging is applied) (equally) which is used by the RX UE for L3 filtering or L3 averaging. For example, the information regarding the number of samples may be information regarding the maximum number of samples or information regarding the minimum number of samples.

For example, in case the TX UE calculates or derives/obtains the RS_PW_REF value, the TX UE may be configured to calculate or derive/obtain the RS_PW_REF value by using a coefficient pre-configured (independently or newly) for L3 filtering or L3 averaging. For example, in case the TX UE calculates or derives/obtains the RS_PW_REF value, the TX UE may be configured to calculate or derive/obtain the RS_PW_REF value by using time window information pre-configured (independently or newly) for L3 filtering or L3 averaging. For example, in case the TX UE calculates or derives/obtains the RS_PW_REF value, the TX UE may be configured to calculate or derive/obtain the RS_PW_REF value by using information regarding the number of samples pre-configured (independently or newly) for L3 filtering or L3 averaging. For example, the information regarding the number of samples may be information regarding the maximum number of samples or information regarding the minimum number of samples.

For example, the coefficient related to L3 filtering or L3 averaging may be configured for UE(s), independently or differently, based on at least one of a type of a service, a priority of a service, requirement related to a service, QoS related to a service, cast type, and/or congestion level. For example, the time window for L3 filtering or L3 averaging may be configured for UE(s), independently or differently, based on at least one of a type of a service, a priority of a service, requirement related to a service, QoS related to a service, cast type, and/or congestion level. For example, the number of samples to which L3 filtering or L3 averaging is applied (e.g., the minimum number of samples or the maximum number of samples) may be configured for UE(s), independently or differently, based on at least one of a type of a service, a priority of a service, requirement related to a service, QoS related to a service, cast type, and/or congestion level.

For example, in case the TX UE calculates or determines the RS_PW_REF value by using a coefficient or information pre-configured (independently or newly), a length of (averaging) time window used by the TX UE for (weight) averaging of RS transmit power may be configured for the TX UE to a relatively smaller value than a length of time window used by the RX UE for L3 filtering or L3 averaging. For example, in case the TX UE calculates or determines the RS_PW_REF value by using a coefficient or information pre-configured (independently or newly), a length of (averaging) time window used by the TX UE for (weight) averaging of RS transmit power may be configured for the TX UE to a relatively larger value than a length of time window used by the RX UE for L3 filtering or L3 averaging.

For example, in case the TX UE calculates or determines the RS_PW_REF value by using a coefficient or information pre-configured (independently or newly), the number of samples used by the TX UE for (weight) averaging of RS transmit power may be configured for the TX UE to a relatively smaller value than the number of samples used by the RX UE for L3 filtering or L3 averaging. For example, in case the TX UE calculates or determines the RS_PW_REF value by using a coefficient or information pre-configured (independently or newly), the number of samples used by the TX UE for (weight) averaging of RS transmit power may be configured for the TX UE to a relatively larger value than the number of samples used by the RX UE for L3 filtering or L3 averaging. For example, the number of samples may be the maximum number of samples. For example, the number of samples may be the minimum number of samples.

For example, in case the TX UE calculates or determines the RS_PW_REF value by using a coefficient or information pre-configured (independently or newly), a (averaging) coefficient used by the TX UE for (weight) averaging of RS transmit power may be configured for the TX UE to a relatively smaller value than a (averaging) coefficient used by the RX UE for L3 filtering or L3 averaging. For example, in case the TX UE calculates or determines the RS_PW_REF value by using a coefficient or information pre-configured (independently or newly), a (averaging) coefficient used by the TX UE for (weight) averaging of RS transmit power may be configured for the TX UE to a relatively larger value than a (averaging) coefficient used by the RX UE for L3 filtering or L3 averaging.

For example, in case the TX UE calculates or derives/obtains the RS_PW_REF value (described above), the TX UE may consider or use transmit power value(s) of RS(s) included in a pre-configured time window, before a time when the TX UE receives (L3 or L1) RSRP value(s) from the RX UE. For example, the TX UE may calculate or determine the RS_PW_REF value based on transmit power value(s) of RS(s) included in a pre-configured time window, before a time when the TX UE receives (L3 or L1) RSRP value(s) from the RX UE.

For example, in case the TX UE calculates or derives/obtains the RS_PW_REF value (described above), the TX UE may consider or use transmit power value(s) of RS(s)

included in a pre-configured time window, before a pre-configured offset value from a time when the TX UE receives (L3 or L1) RSRP value(s) from the RX UE. For example, the TX UE may calculate or determine the RS_PW_REF value based on transmit power value(s) of RS(s) included in a pre-configured time window, before a pre-configured offset value from a time when the TX UE receives (L3 or L1) RSRP value(s) from the RX UE.

For example, in case the TX UE calculates or derives/obtains the RS_PW_REF value (described above), the TX UE may consider or use transmit power value(s) of the pre-configured number of RS transmissions and/or the pre-configured number of RSs, before a time when the TX UE receives (L3 or L1) RSRP value(s) from the RX UE. For example, the TX UE may calculate or determine the RS_PW_REF value based on transmit power value(s) of the pre-configured number of RS transmissions and/or the pre-configured number of RSs, before a time when the TX UE receives (L3 or L1) RSRP value(s) from the RX UE.

For example, in case the TX UE calculates or derives/obtains the RS_PW_REF value (described above), the TX UE may consider or use transmit power value(s) of the pre-configured number of RS transmissions and/or the pre-configured number of RSs, before a pre-configured offset value from a time when the TX UE receives (L3 or L1) RSRP value(s) from the RX UE. For example, the TX UE may calculate or determine the RS_PW_REF value based on transmit power value(s) of the pre-configured number of RS transmissions and/or the pre-configured number of RSs, before a pre-configured offset value from a time when the TX UE receives (L3 or L1) RSRP value(s) from the RX UE.

For example, in the second case and/or in the third case, the TX UE may already know at least one of a coefficient related to L3 filtering or L3 averaging used by the RX UE, information regarding a time window for which the RX UE performs L3 filtering or L3 averaging, and/or information regarding the number of samples (e.g., RS) used by the RX UE for L3 filtering or L3 averaging. For example, the information regarding the time window may include at least one of a length of the time window, a start time of the time window, and/or an end time of the time window. For example, the information regarding the number of samples may include the maximum number of samples and/or the minimum number of samples. For example, the TX UE may receive at least one of a coefficient related to L3 filtering or L3 averaging used by the RX UE, information regarding a time window for which the RX UE performs L3 filtering or L3 averaging, and/or information regarding the number of samples (e.g., RS) used by the RX UE for L3 filtering or L3 averaging, through pre-defined signaling. For example, the pre-defined signaling may be PC5 RRC signaling between the TX UE and the RX UE. For example, the pre-defined signaling may be (pre-)configuration(s) (e.g., SIB, RRC signaling) which is transmitted by the network to the TX UE.

For example, in the second case and/or in the third case, a coefficient related to L3 filtering or L3 averaging used by the RX UE and the TX UE, a length of a time window for which the RX UE and the TX UE perform L3 filtering or L3 averaging, a start time of a time window for which the RX UE and the TX UE perform L3 filtering or L3 averaging, an end time of a time window for which the RX UE and the TX UE perform L3 filtering or L3 averaging, and/or the number of samples used by the RX UE and the TX UE for L3 filtering or L3 averaging may be the same. For example, the number of samples may be the maximum number of samples and/or the minimum number of samples.

For example, a coefficient related to L3 filtering or L3 averaging may be configured for UE(s) per a carrier or per a (resource) pool. For example, a time window (e.g., a length of a time window, a start time of a time window, and/or an end time of a time window) for performing L3 filtering or L3 averaging may be configured for UE(s) per a carrier or per a (resource) pool. For example, a coefficient related to L3 filtering or L3 averaging may be configured for UE(s) per a carrier or per a (resource) pool. For example, the number of samples to which L3 filtering or L3 averaging is applied (e.g., the maximum number of samples and/or the minimum number of samples) may be configured for UE(s) per a carrier or per a (resource) pool.

In step S1240, the TX UE may determine transmit power based on the pathloss. In addition, the TX UE may perform SL transmission by using the value of transmit power.

Meanwhile, the TX UE may not be able to efficiently or normally determine transmit power based on SL pathloss. Therefore, if the TX UE is not able to efficiently or normally determine transmit power based on SL pathloss, a method for handling this may be required.

For example, only after the TX UE receives value(s) of RSRP from the RX UE, the TX UE may be configured to change or update the RS_PW_REF value. For example, only after the TX UE receives value(s) of (L3 or L1) RSRP a pre-configured number of times (e.g., 1) from the RX UE, the TX UE may change or update the RS_PW_REF value. For example, only after the TX UE receives value(s) of (L3 or L1) RSRP from the RX UE within a pre-configured time window, the TX UE may change or update the RS_PW_REF value.

For example, only after the TX UE receives value(s) of RSRP from the RX UE, the TX UE may be configured to change or update a value of transmit power of RS (s). For example, only after the TX UE receives value(s) of (L3 or L1) RSRP a pre-configured number of times (e.g., 1) from the RX UE, the TX UE may change or update a value of (actual) transmit power of RS(s) (on reserved/selected resource(s)). For example, only after the TX UE receives value(s) of (L3 or L1) RSRP from the RX UE within a pre-configured time window, the TX UE may change or update a value of (actual) transmit power of RS(s) (on reserved/selected resource(s)).

For example, only after a timer pre-configured for the TX UE expires, the TX UE may be configured to change or update the RS_PW_REF value. For example, only after a timer pre-configured for the TX UE expires, the TX UE may change or update the RS_PW_REF value.

For example, only after a timer pre-configured for the TX UE expires, the TX UE may be configured to change or update a value of transmit power of RS(s). For example, only after the timer pre-configured for the TX UE expires, the TX UE may change or update a value of (actual) transmit power of RS(s) (on reserved/selected resource(s)).

For example, only after passing a time window, the TX UE may be configured to change or update the RS_PW_REF value. For example, only after passing a time window, the TX UE may change or update the RS_PW_REF value.

For example, only after passing a time window, the TX UE may be configured to change or update a value of transmit power of RS(s). For example, only after passing a time window, the TX UE may change or update a value of (actual) transmit power of RS(s) (on reserved/selected resource(s)).

For example, if at least one of the conditions below is satisfied, the TX UE may fall back to a pre-defined transmit power determination method. For example, if at least one of the conditions below is satisfied, the TX UE may determine transmit power based on a pre-defined transmit power determination method, and the TX UE may perform SL transmission based on the transmit power.

if the TX UE determines that value(s) of RSRP received from the RX UE is not available, and/or if the TX UE determines that value(s) of RSRP received from the RX UE is not valid, and/or if the TX UE does not (successfully) receive value(s) of RSRP from the RX UE, for example, if the TX UE does not (successfully) receive value(s) of RSRP more than a pre-configured threshold number of times from the RX UE, and/or if accuracy of value(s) of RSRP reported by the RX UE to the TX UE does not satisfy a pre-configured criterion, for example, if the TX UE determines that accuracy of value(s) of RSRP reported by the RX UE does not satisfy a pre-configured criterion, and/or if SL link quality between the TX UE and the RX UE is less than or equal to a pre-configured threshold or a pre-configured criterion, and/or if accuracy of a result of SL measurement received from the RX UE is less than or equal to a pre-configured threshold or a pre-configured criterion, and/or if RLF is generated or declared between the TX UE and the RX UE, and/or if the RX UE is out of a communication range of the TX UE, and/or if Qout is reported or declared, for example, if Qout for a link is declared because a hypothetical error rate (of control channel) calculated/obtained with pre-defined RS(s) in radio link monitoring (RLM) is lower than a pre-defined threshold, and/or if PC5 RRC connection(s) between the TX UE and the RX UE is interrupted or re-established, for example, if session(s) (e.g., unicast session(s) or groupcast session(s)) between the TX UE and RX UE is interrupted or re-established;

For example, the pre-defined transmit power determination method may include: a method in which the TX UE performs SL transmission with the maximum transmit power value of the TX UE. For example, the pre-defined transmit power determination method may include: a method in which the TX UE determines transmit power based on a transmit power determination formula related to a pre-configured communication type (e.g., broadcast), and performs SL transmission with the determined transmit power value. For example, the pre-defined transmit power determination method may include: a method in which the TX UE determines transmit power based on parameters such as parameters related to open-loop power control (OLPC) (e.g., Po, alpha value) (excluding SL pathloss), the number of (scheduled) RBs, etc., and performs SL transmission with the determined transmit power value. For example, the pre-defined transmit power determination method may include: a method in which the TX UE determines transmit power based on SL pathloss after the TX UE estimates/obtains the SL pathloss based on RS(s) transmitted by the RX UE, and performs SL transmission with the determined transmit power value. In this case, it is assumed that the TX UE already knows a value of transmit power of RS(s) transmitted by the RX UE. For example, the TX UE may receive information related to the value of transmit power of the RS(s) transmitted by the RX UE through pre-defined signaling.

Based on various embodiments of the present disclosure, the TX UE may efficiently determine SL transmit power based on a pathloss value between the TX UE and the RX UE. Furthermore, if the TX UE cannot determine SL transmit power based on a pathloss value, the TX UE may efficiently determine SL transmit power based on other scheme(s).

Figure 13:
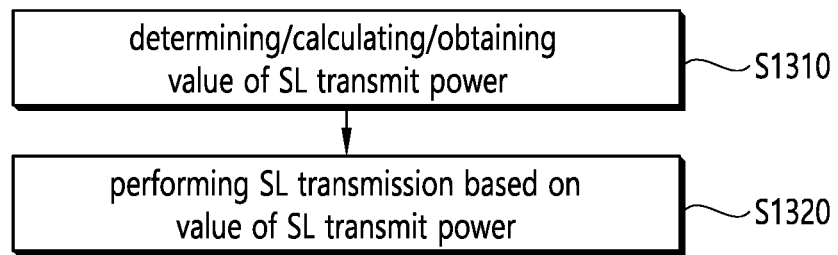
FIG. 13 shows a method for a first device to determine transmit power, based on an embodiment of the present disclosure.

FIG. 13 shows a method for a first device to determine transmit power, based on an embodiment of the present disclosure. The embodiment of FIG. 13 may be combined with various embodiments of the present disclosure.

Referring to FIG. 13, in step S1310, a first device may determine/calculate/obtain a value of SL transmit power. For example, the value of SL transmit power may be determined/calculated/obtained based on SL pathloss between the first device and a second device. For example, the first device may determine/calculate/obtain the value of SL transmit power based on various embodiments of the present disclosure.

In step S1320, the first device may perform SL transmission based on the value of SL transmit power.

Additionally, the first device may perform synchronization with a synchronization source, and the first device may perform the above-described operation based on the synchronization. Additionally, the first device may configure one or more BWPs, and the first device may perform the above-described operation based on the one or more BWPs.

The proposed method can be applied to device(s) described below. First, the processor (102) of the first device (100) may determine/calculate/obtain a value of SL transmit power. In addition, the processor (102) of the first device (100) may control the transceiver (106) to perform SL transmission based on the value of SL transmit power.

Figure 14:
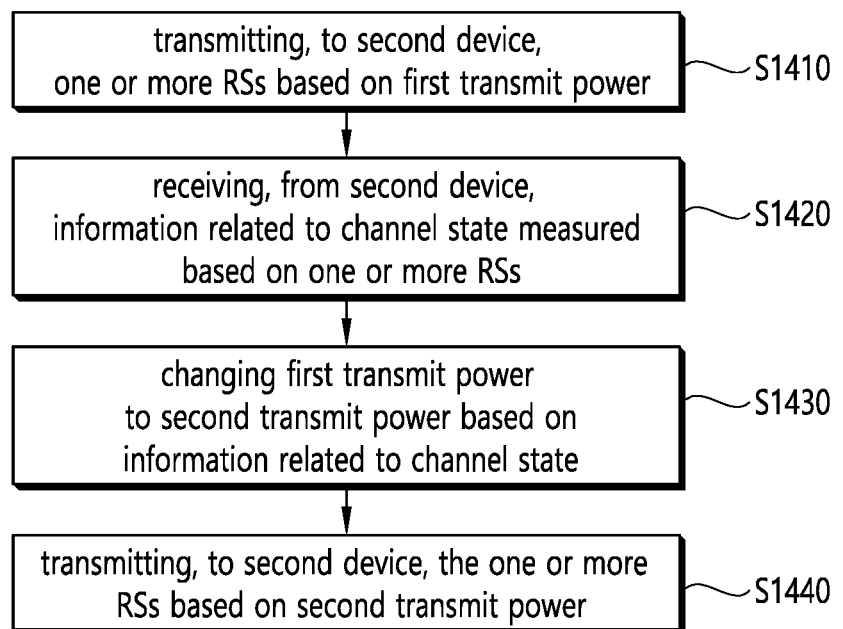
FIG. 14 shows a method for a first device to perform wireless communication, based on an embodiment of the present disclosure.

FIG. 14 shows a method for a first device to perform wireless communication, based on an embodiment of the present disclosure. The embodiment of FIG. 14 may be combined with various embodiments of the present disclosure.

Referring to FIG. 14, in step S1410, a first device may transmit, to a second device, one or more reference signals (RSs) based on first transmit power.

In step S1420, the first device may receive, from the second device, information related to a channel state measured based on the one or more RSs.

In step S1430, the first device may change the first transmit power to second transmit power based on the information related to the channel state.

In step S1440, the first device may transmit, to the second device, the one or more RSs based on the second transmit power.

For example, the first transmit power may be changed to the second transmit power, based on the first device determining that the information related to the channel state is not valid. For example, the first transmit power may be changed to the second transmit power, based on the first device not receiving the information related to the channel state more than a threshold number of times. For example, the first transmit power may be changed to the second transmit power, based on accuracy of the information related to the channel state which does not satisfy a pre-configured criterion. For example, the first transmit power may be changed to the second transmit power, based on link quality between the first device and the second device which does not satisfy a pre-configured criterion.

For example, the first device may not receive the information related to the channel state measured based on the one or more RSs from the second device. For example, before a unicast session is established between the first device and the second device, the first device may not receive the information related to the channel state from the second device. For example, if the number of RSs transmitted by the first device is smaller than the number of RSs (e.g., the minimum number of RSs) required for the second device to measure the channel state, the second device may not measure the channel state based on RS(s) transmitted by the first device. Accordingly, the first device may not receive the information related to the channel state from the second device. For example, if the first device does not receive the information related to the channel state measured based on the one or more RSs from the second device, the first transmit power may be changed to the second transmit power.

For example, the second transmit power may be a maximum transmit power of the first device. For example, the second transmit power may be determined based on at least one of a parameter related to open loop power control (OLPC) or a number of resource blocks (RBs) allocated to the first device, and pathloss between the first device and the second device may be not used for determining the second transmit power.

Additionally, for example, the first device may obtain pathloss between the first device and the second device based on one or more RSs transmitted by the second device. In this case, the second transmit power may be determined based on the pathloss.

For example, the first transmit power may be a maximum transmit power of the first device. In this case, additionally, the first device may obtain pathloss between the first device and the second device based on the first transmit power and the information related to the channel state. In this case, for example, the first transmit power may be changed to the second transmit power based on the pathloss.

For example, the first transmit power may be time-varying. In this case, additionally, the first device may determine reference transmit power of the first transmit power. For example, a layer-3 (L3) filter coefficient value used by the first device to determine the reference transmit power may be the same as a L3 filter coefficient value used by the second device to obtain the information related to the channel state. Additionally, the first device may obtain pathloss between the first device and the second device based on the reference transmit power and the information related to the channel state. In this case, for example, the first transmit power may be changed to the second transmit power based on the pathloss.

The proposed method can be applied to device(s) described below. First, the processor (102) of the first device (100) may control the transceiver (106) to transmit, to a second device, one or more reference signals (RSs) based on first transmit power. In addition, the processor (102) of the first device (100) may control the transceiver (106) to receive, from the second device, information related to a channel state measured based on the one or more RSs. In addition, the processor (102) of the first device (100) may change the first transmit power to second transmit power based on the information related to the channel state. In addition, the processor (102) of the first device (100) may control the transceiver (106) to transmit, to the second device, the one or more RSs based on the second transmit power.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, one or more reference signals (RSs) based on first transmit power; receive, from the second device, information related to a channel state measured based on the one or more RSs; change the first transmit power to second transmit power based on the information related to the channel state; and transmit, to the second device, the one or more RSs based on the second transmit power.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: transmit, to a second UE, one or more reference signals (RSs) based on first transmit power; receive, from the second UE, information related to a channel state measured based on the one or more RSs; change the first transmit power to second transmit power based on the information related to the channel state; and transmit, to the second UE, the one or more RSs based on the second transmit power.

Based on an embodiment of the present disclosure, a non-transitory computer-readable storage medium storing instructions may be provided. For example, the instructions, when executed, may cause a first device to: transmit, to a second device, one or more reference signals (RSs) based on first transmit power; receive, from the second device, information related to a channel state measured based on the one or more RSs; change the first transmit power to second transmit power based on the information related to the channel state; and transmit, to the second device, the one or more RSs based on the second transmit power.

Figure 15:
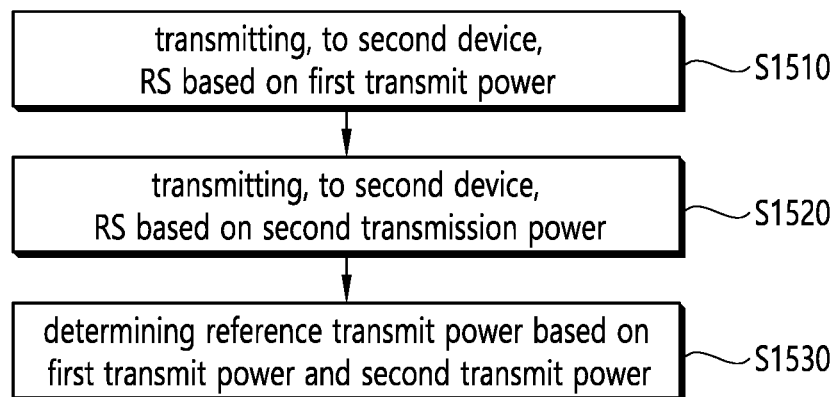
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, a first device may transmit, to a second device, a reference signal (RS) based on first transmit power.

In step S1520, the first device may transmit, to the second device, the RS based on second transmission power.

In step S1530, the first device may determine reference transmit power based on the first transmit power and the second transmit power. For example, the reference transmit power may be determined based on a layer-3 (L3) filter coefficient value.

For example, the L3 filter coefficient value used by the first device to determine the reference transmit power may be the same as a L3 filter coefficient value used by the second device to obtain information related to a channel state based on the RS.

The proposed method can be applied to device(s) described below. First, the processor (102) of the first device (100) may control the transceiver (106) to transmit, to a second device, a reference signal (RS) based on first transmit power. In addition, the processor (102) of the first device (100) may control the transceiver (106) to transmit, to the second device, the RS based on second transmission power. In addition, the processor (102) of the first device (100) may determine reference transmit power based on the first transmit power and the second transmit power.

Based on an embodiment of the present disclosure, a first device configured to perform wireless communication may be provided. For example, the first device may comprise:

one or more memories storing instructions; one or more transceivers; and one or more processors connected to the one or more memories and the one or more transceivers. For example, the one or more processors may execute the instructions to: transmit, to a second device, a reference signal (RS) based on first transmit power; transmit, to the second device, the RS based on second transmission power; and determine reference transmit power based on the first transmit power and the second transmit power. For example, the reference transmit power may be determined based on a layer-3 (L3) filter coefficient value.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
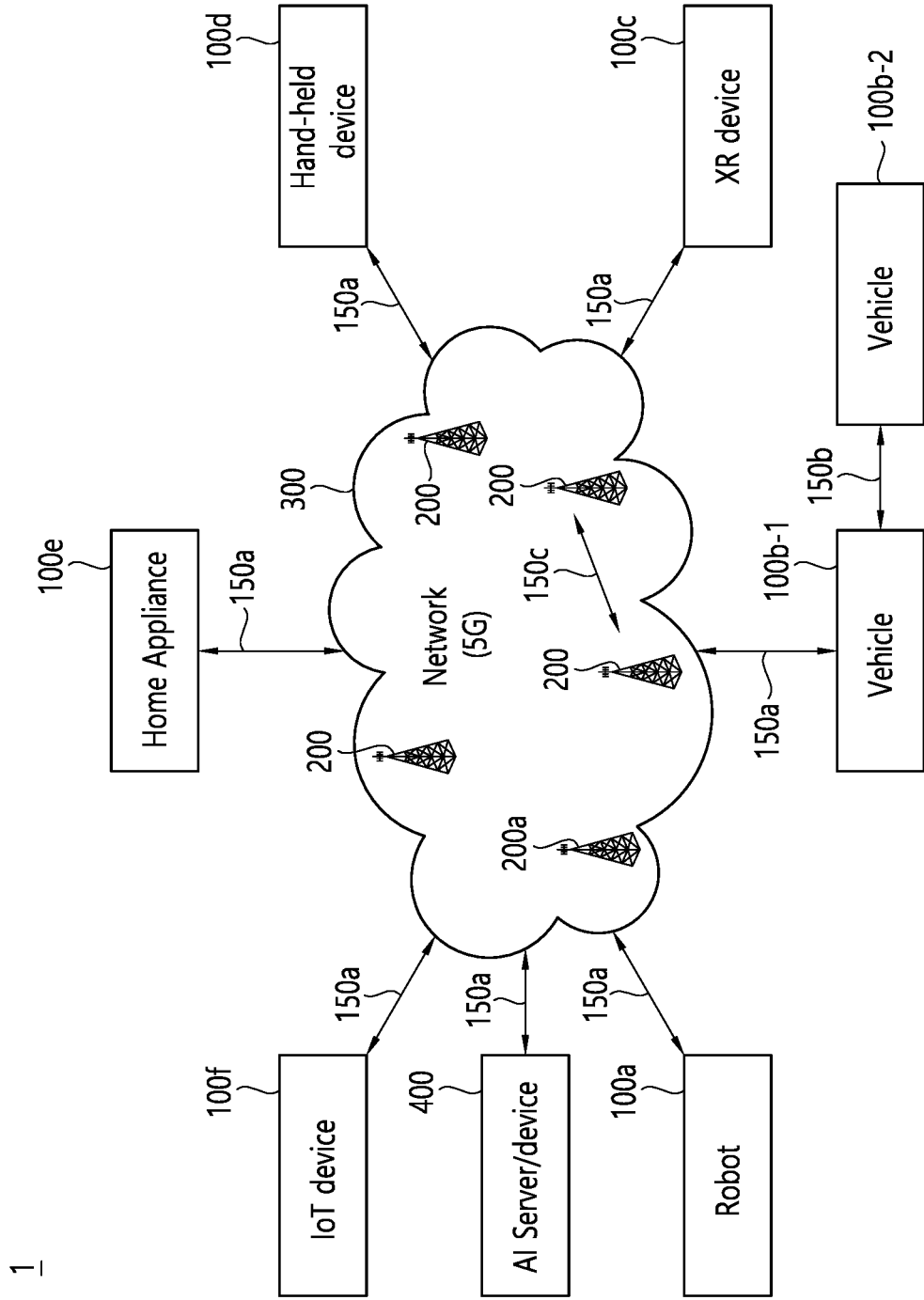
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
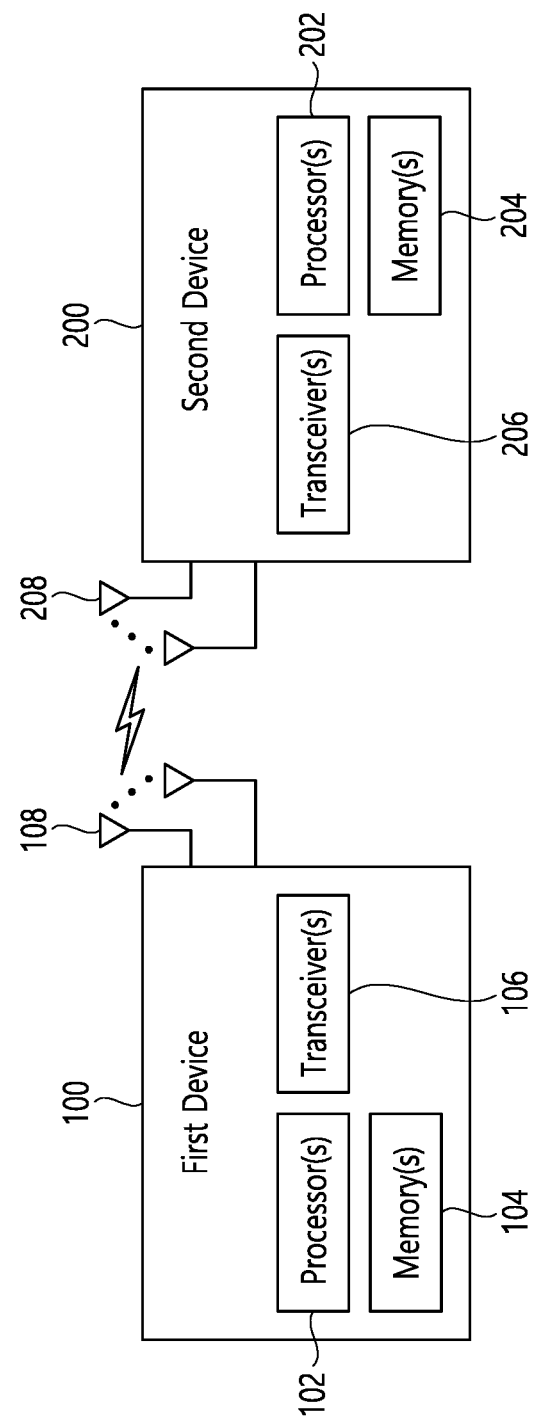
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
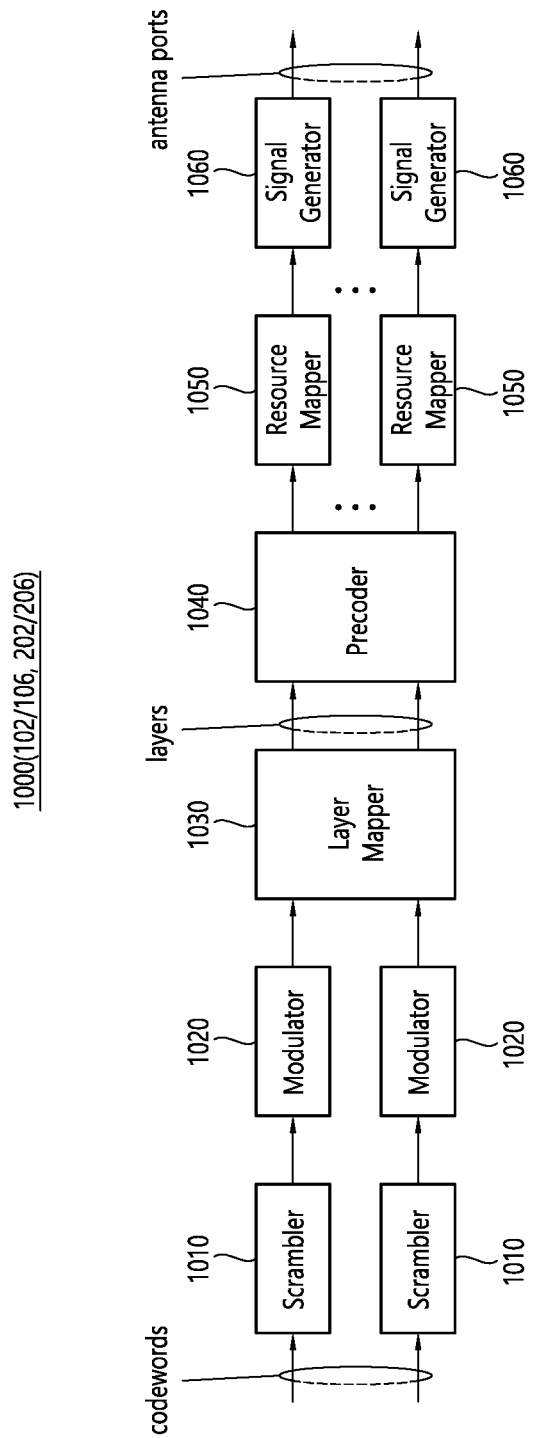
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
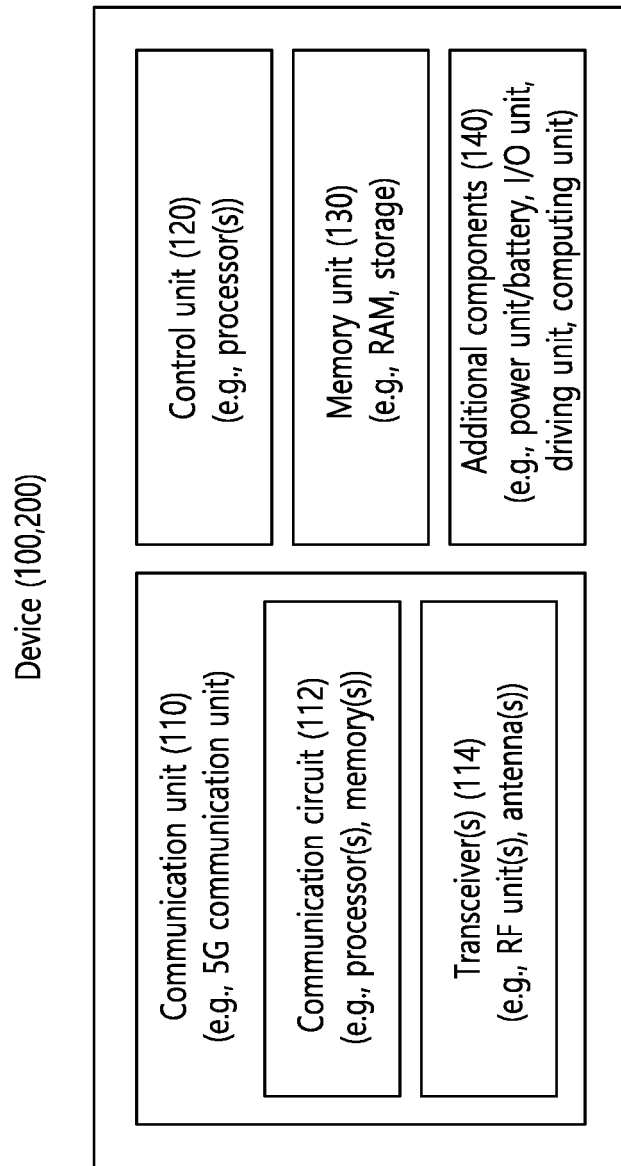
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
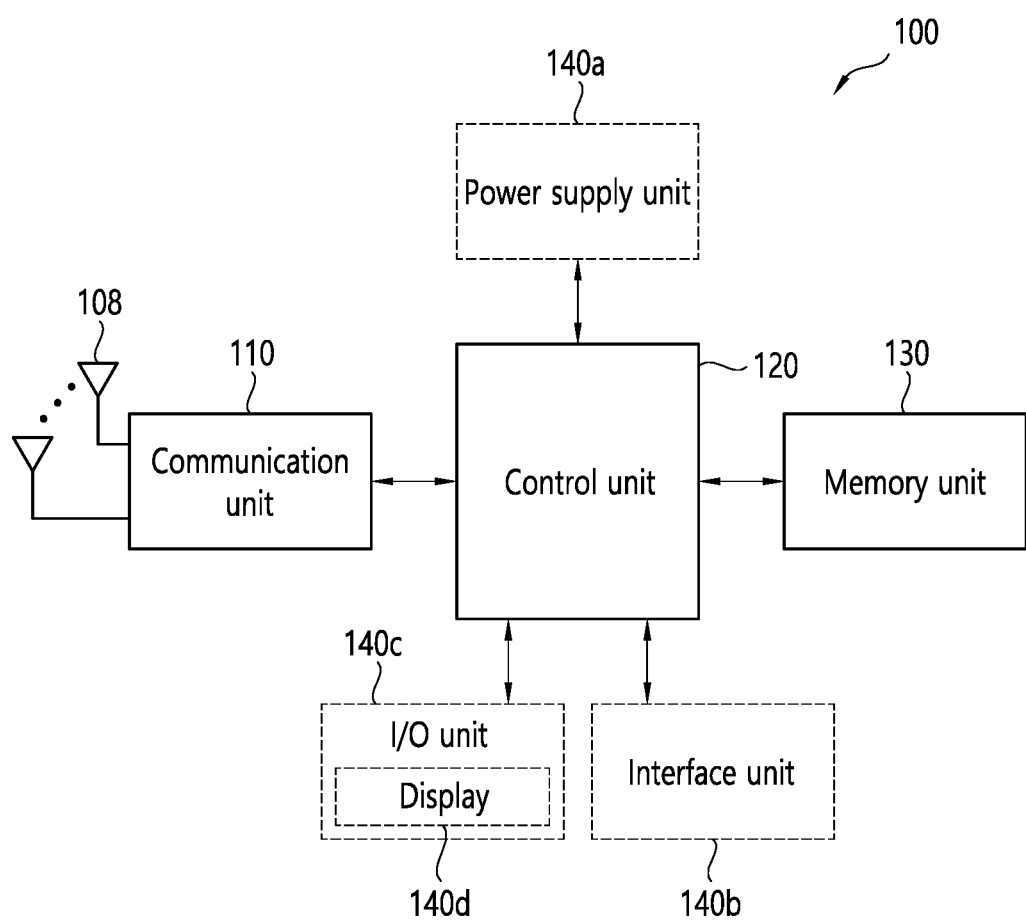
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
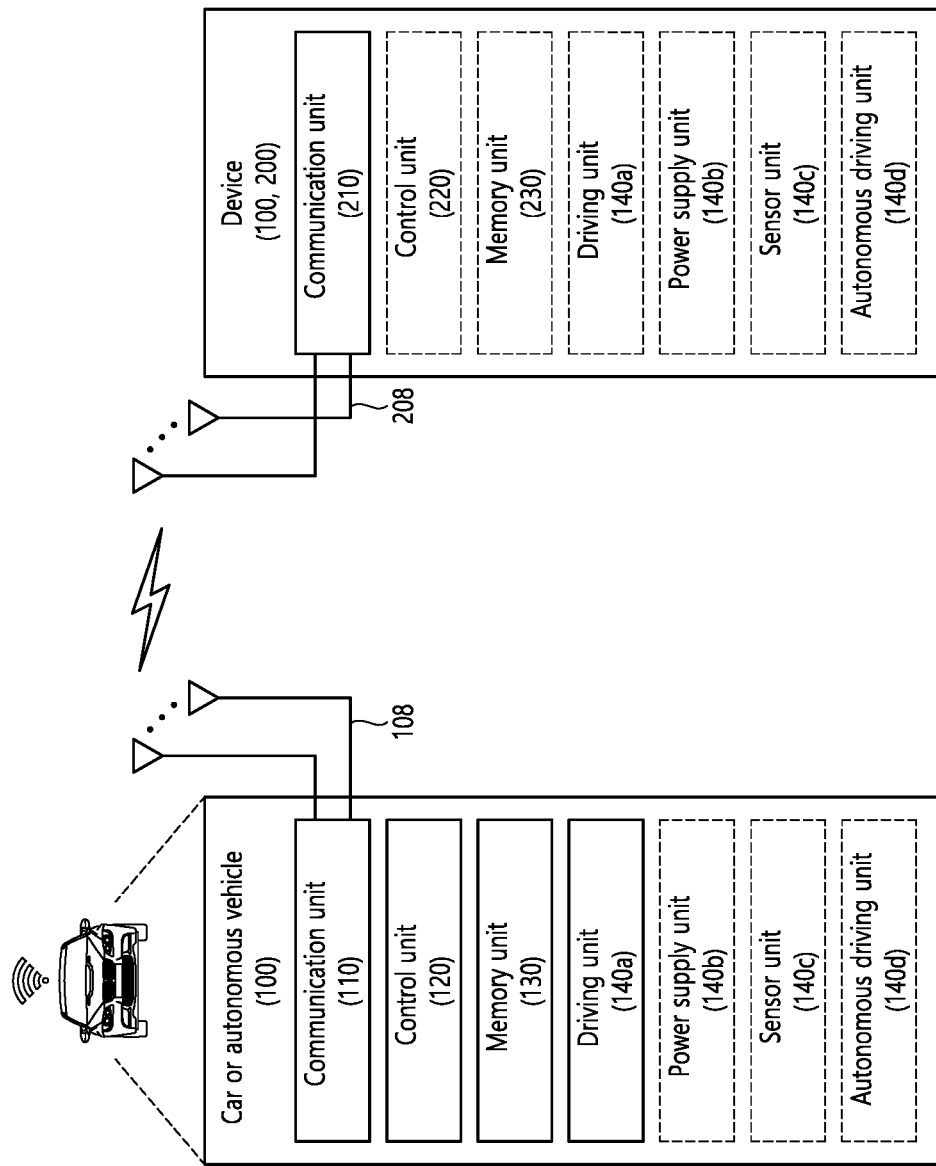
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   transmitting sidelink control information (SCI) to a second device through a physical sidelink control channel (PSCCH);
   transmitting, to the second device through a physical sidelink shared channel (PSSCH), at least one demodulation reference signal (DMRS) for reference signal received power (RSRP) measurement;
   obtaining reference signal power from transmit power layer-3 (L3) filtered using L3 filter coefficient information;
   receiving, from the second device, information related to RSRP L3 filtered using L3 filter coefficient information;
   obtaining a sidelink (SL) pathloss by subtracting the L3 filtered RSRP from the L3 filtered reference signal power; and
   determining first transmit power based on the SL pathloss.

2. The method of claim 1, wherein the L3 filter coefficient information used for the transmit power L3 filtering and the RSRP L3 filtering corresponds to a same filter coefficient value.

3. The method of claim 1, wherein the information related to the L3 filtered RSRP is obtained by the second device.

4. The method of claim 1, wherein the L3 filter coefficient information is configured for each resource pool.

5. The method of claim 1, further comprising transmitting, to the second device, a PC5 radio resource control (RRC) message including information related to the L3 filter coefficient information.

6. The method of claim 1, further comprising receiving, from the second device, a PC5 radio resource control (RRC) message including information related to the L3 filter coefficient information.

7. The method of claim 1, wherein the determining the first transmit power based on the SL pathloss is based on a unicast communication being performed between the first device and the second device.

8. The method of claim 1, wherein the determining the first transmit power based on the SL pathloss comprises:
   obtaining a downlink (DL) pathloss between the first device and a base station,
   wherein the first transmit power is determined based on a minimum value among (i) second transmit power obtained based on the SL pathloss and (ii) third transmit power obtained based on the DL pathloss.

9. The method of claim 1, further comprising establishing a unicast connection with the second device.

10. The method of claim 1, further comprising changing the first transmit power to fourth transmit power, based on a determination that the information related to the L3 filtered RSRP is invalid.

11. The method of claim 10, wherein the fourth transmit power is maximum transmit power of the first device.

12. The method of claim 1, further comprising changing the first transmit power to fourth transmit power, based on failure to receive the information related to the L3 filtered RSRP more than a threshold number of times.

13. The method of claim 1, further comprising changing the first transmit power to fourth transmit power, based on accuracy of the information related to the L3 filtered RSRP not satisfying a configured criterion.

14. The method of claim 1, further comprising changing the first transmit power to fourth transmit power, based on link quality between the first device and the second device not satisfying a configured criterion.

15. The method of claim 14, wherein the fourth transmit power is determined based on at least one of a parameter related to open loop power control (OLPC) or a number of resource blocks (RBs) allocated to the first device, and
   wherein the SL pathloss is not used for determining the fourth transmit power.

16. The method of claim 1, wherein the first transmit power is time-varying.

17. A first device configured to perform wireless communication, the first device comprising:
   one or more memories storing instructions;
   one or more transceivers; and
   one or more processors connected to the one or more memories and the one or more transceivers, wherein the one or more processors execute the instructions to:
   transmit sidelink control information (SCI) to a second device through a physical sidelink control channel (PSCCH);
   transmit, to the second device through a physical sidelink shared channel (PSSCH), at least one demodulation reference signal (DMRS) for reference signal received power (RSRP) measurement;
   obtain reference signal power from transmit power layer-3 (L3) filtered using L3 filter coefficient information;
   receive, from the second device, information related to RSRP L3 filtered using L3 filter coefficient information;
   obtain a sidelink (SL) pathloss by subtracting the L3 filtered RSRP from the L3 filtered reference signal power; and
   determine first transmit power based on the SL pathloss.

18. The first device of claim 17, wherein the L3 filter coefficient information used for the transmit power L3 filtering and the RSRP L3 filtering corresponds to a same filter coefficient value.

19. An apparatus of a first user equipment (UE), the apparatus comprising:
   one or more processors; and
   one or more memories operably connected to the one or more processors and storing instructions, wherein the one or more processors execute the instructions to:
   transmit sidelink control information (SCI) to a second UE through a physical sidelink control channel (PSCCH);
   transmit, to the second UE through a physical sidelink shared channel (PSSCH), at least one demodulation reference signal (DMRS) for reference signal received power (RSRP) measurement;
   obtain reference signal power from transmit power layer-3 (L3) filtered using L3 filter coefficient information;

receive, from the second UE, information related to RSRP L3 filtered using L3 filter coefficient information;

obtain a sidelink (SL) pathloss by subtracting the L3 filtered RSRP from the L3 filtered reference signal power; and determine first transmit power based on the SL pathloss.

20. The apparatus of claim 19, wherein the L3 filter coefficient information used for the transmit power L3 filtering and the RSRP L3 filtering corresponds to a same filter coefficient value.

* * * * *